United States Patent [19]
McCain et al.

[11] Patent Number: 6,129,449
[45] Date of Patent: Oct. 10, 2000

[54] SELF-CONTAINED PORTABLE COMPUTING UNIT

[75] Inventors: Joseph H. McCain, Plano; E. R. Webb, Temple; William R. Lueders, McKinney, all of Tex.

[73] Assignee: Texas Instruments Incorporated, Dallas, Tex.

[21] Appl. No.: 08/389,087

[22] Filed: Feb. 14, 1995

Related U.S. Application Data

[60] Continuation of application No. 08/090,354, Jul. 12, 1993, abandoned, which is a division of application No. 07/939,565, Sep. 2, 1992, Pat. No. 5,309,351, which is a continuation of application No. 07/808,036, Dec. 12, 1991, abandoned, which is a continuation of application No. 07/263,679, Oct. 27, 1988, abandoned.

[51] Int. Cl.[7] ..................................................... G06F 15/00
[52] U.S. Cl. .................... 364/479.14; 345/173; 235/472; 361/679
[58] Field of Search ..................................... 395/800, 775; 340/310, 712–721, 310.6; 364/708–711, 479.14; 365/800; 235/380, 382, 462, 472; 399/80, 79; 713/185; 712/1; 361/636, 679, 684, 690, 681; 345/23, 116, 197, 173; 705/28; 708/134, 163

[56] References Cited

U.S. PATENT DOCUMENTS

| | | | |
|---|---|---|---|
| 4,497,036 | 1/1985 | Dunn | 364/708 |
| 4,608,486 | 8/1986 | Berstein et al. | 235/380 |
| 4,608,872 | 9/1986 | Mayer et al. | 73/862.23 |
| 4,725,694 | 2/1988 | Auer et al. | 178/18 |
| 4,766,427 | 8/1988 | Abe et al. | 340/721 |
| 4,774,493 | 9/1988 | Rabinowitz | 340/310 |
| 4,850,009 | 7/1989 | Zook et al. | 379/96 |
| 4,855,725 | 8/1989 | Fernadez | 340/706 |
| 4,894,792 | 1/1990 | Mitchell et al. | 364/705 |
| 4,916,441 | 4/1990 | Gombrich | 340/712 |

OTHER PUBLICATIONS

Robinson; "The HP150"; *BYTE* Oct. 1983, pp. 36–50.

*Primary Examiner*—Larry D. Donaghue
*Attorney, Agent, or Firm*—W. Daniel Swayze, Jr.; W. James Brady, III; Frederick J. Telecky, Jr.

[57] ABSTRACT

A data and communication system including a hand-held unit (17) and an infrared communication satellite (10) is used to provide for the interchange of data between a host computer (13), individual personal computers (15), the hand-held computing unit (17) and factory machinery, including process controllers.

32 Claims, 5 Drawing Sheets

Fig. 8

SELF-CONTAINED PORTABLE COMPUTING UNIT

This application is a Continuation of application Ser. No. 08/090,354 filed Jul. 12, 1993 now abandoned, which is a divisional of Ser. No. 07/939,565 filed Sep. 2, 1992 U.S. Pat. No. 5,309,351, which is a continuation of Ser. No. 07/808,036 filed Dec. 12, 1991 now abandoned, which is a continuation of Ser. No. 07/263,679 filed Oct. 27, 1988 now abandoned.

FIELD OF THE INVENTION

This invention relates to computer systems and terminals, and more particularly to a communications, information, maintenance, diagnostic, and training system using an infrared communications link, and including self-contained, portable components.

BACKGROUND OF THE INVENTION

Infrared has been used in communications links to carry voice and data information from a remote location to a central communications or data center. Such wireless links allow data exchange and monitoring of machine operations. One such system is disclosed in the publication OPTICAL SPECTRA, December 1979, pages 17–22.

Infrared has also been used in inventory systems in which bar codes are read and the data therefrom transmitted to a computer, or in systems that provide communication between a programmable controller and machinery. Such a system identified as LIGHTLINK is briefly disclosed in a system specification sheet published by CYPLEX, a division of CONTROLONICS CORPORATION of Chelmsford, Me.

Other infrared linked computer systems have been disclosed in the prior art, but for the most part the systems are for simple communications, or for sending data to a central control station, or transmitting control data from a controller to send motion control data to operating machinery.

SUMMARY OF THE INVENTION

The invention is to a hand-held device, a satellite, one or more infrared nodes, and a system in which the device is used, and to a method of providing detailed diagnostic, repair, and maintenance information in a processor-controlled, hand-held device for use in any environment where operating equipment may be maintained by minimally trained personnel.

The device includes a microprocessor that has an architecture that supports an 8-bit data bus and an address bus capable of direct access to one megabyte of RAM memory including 64 kbytes of Input/Output space mapped into low order RAM memory. The architecture may be logically expanded to 16 and 32 bit devices. A boot ROM contains initialization and system configuration information which is used at power turn-on. A DRAM of dynamic-random-access-memory space is used for storage for operating programs.

Page mode EPROM devices are mapped into the I/O space and can be used to store up to 256 KBytes of user program. These devices are configured as a ROM-disk device by the system software.

A liquid crystal display operates in conjunction with an LCD control methodology. The LCD control includes two LCD controllers operating synchronously to provide split screen operation, providing capability of simultaneous text and graphics display.

A Display Touch Scanner is used to scan the surface of the display to determine where and when the display has been touched, to provide touch input to the system, and to control the operation sequence for various applications of the invention.

An optical compact disk (CD) provides a vast storage for supporting a data base used in the invention. Data such as text and graphic information is stored for use in applications such as training, maintenance, and repair of equipment. The graphic information may be displayed in static or animated form.

The device of the invention may be used in interfacing with machines, other devices and/or other data or control systems, and serves as one unit of a network which communicates via infrared or direct wired connections.

A satellite or satellites may be conveniently placed within an area of operation to send data to or receive data from the hand-held unit, and to transmit data to the hand-held unit from operating machinery, from other hand-held devices, or computer/processor units. This is accomplished by use of IR nodes connecting the units to the IR network through data ports.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 8 illustrates an example of a screen menu display of the hand-held unit.

PREFERRED EMBODIMENT OF THE INVENTION

Figure 1:
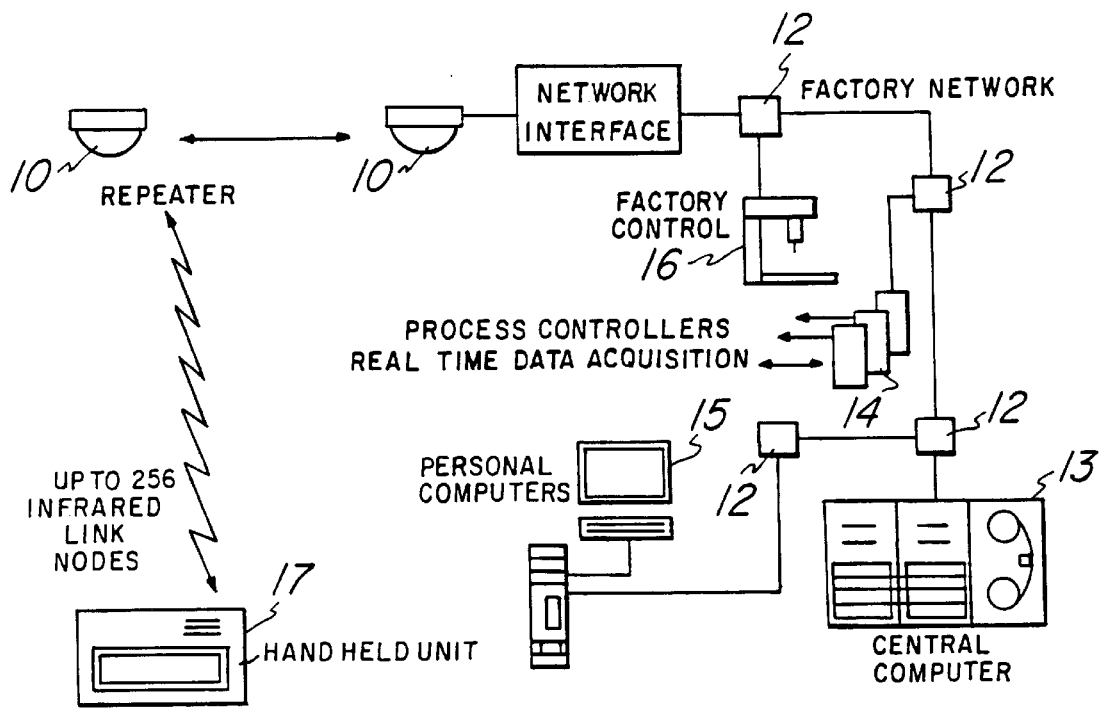
FIG. 1 is a diagram of one concept of the invention illustrating a hand-held unit used in conjunction with other units in the system.

The system of the present invention, in one embodiment, is illustrated in FIG. 1. The basic system is comprised of a network of devices including one or more satellite units 10 which provide a wireless communications means, a multiplicity of nodal devices which may use the wireless communications means, and one or more network interface modules 12, which can be used to allow the nodes to communicate with host computers 13, process controllers 14 or other networked devices such as personal computers 15, factory control processors 16, and residing on common communications networks such as Ethernet, MAP or Token Ring. The basic system allows the hand-held units, which are described in detail below, to perform either individually or in concert with other devices on the network.

Figure 2:
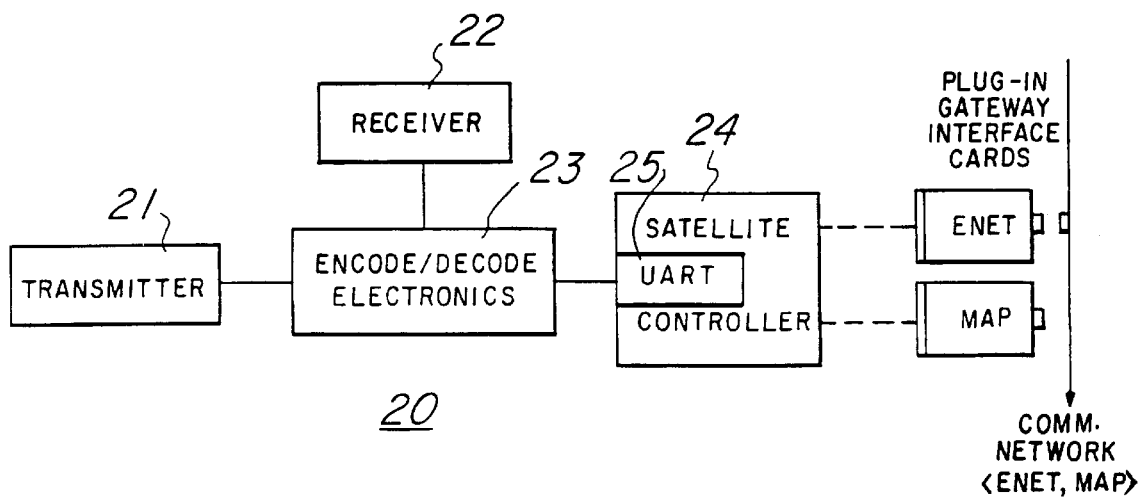
FIG. 2 is a block diagram of the satellite system used in the present invention.

The satellite unit 20, illustrated in FIG. 2, provide a network control function for all network resident devices. It includes a multiplicity of infrared emitting diodes, in transmitter 21, operating in this case at 880 nanometers, which are modulated to allow transmission of digital information to all nodal devices containing receive diodes sensitive in the same wavelength and within reasonable range of the satellite unit.

The satellite also includes receiving diodes, in receiver 22, sensitive to light in the 880 nanometer wavelength band, which can receive modulated light pulses, representing digital data, transmitted from the wireless network nodal devices.

Each set of transmit/receive diodes, whether resident in the satellite or in the nodal devices, comprises the OSI Layer 1 interface for the wireless network. The receive diodes pass information to a sensitive receiver, which then feeds a Encoder/Decoder circuit 23, which includes a transimpedance amplifier and low pass filtering, prior to flowing to an amplifier which provides sufficient gain for subsequent processing. The signal is then AC coupled to a limiter. The limiter output is then fed to additional filters for the specific transmit frequency, and again limited for input to a digital phase lock loop, which separates the signal and the clock.

The data is then fed to a communications controller 25 (USART), which converts the transmitted data back to serial binary data for use by the local satellite controller CPU 24. In this way, the data transmitted by either the satellite or any of the system nodes can be received and used by the target node. Addresses contained in the transmitted data are interpreted to determine the target node.

The transmitter at each node or at the satellite receives data initially from the local CPU which sends serial binary data to the USART for conversion to RS232C levels to feed a Manchester encoder and transceiver. This output, which is used normally for synchronous communications, is used to drive the transmit diodes for infrared signal outputs, modulated by the data stream. A single oscillator determines the data rate of the transmission through the encoder/decoder circuit 23.

The satellite can control the network activity using a polled technique or respond to an interrupt transmission. The satellite also provides interfaces to other wired networks through the use of network interface circuits adapted to the specific network protocol, for example Enet or MAP. This allows transfer of data from a nodal device to a computer resident on a wired network.

Conversely, data may be requested by a nodal device, from a wired network device for subsequent transmission to the nodal device, using the wireless network.

The satellite contains a central processing unit in controller 24 to control the network activity as well as providing access to other wired networks through network interface modules and standard communications software designed to work with the dedicated network interface module.

The CPU also controls cooperative satellite efforts requiring priority, hand-off and transmit timing for multiple satellite wireless networks. A designated satellite operates as the master satellite, controlling the operation of other nearby satellites. This master communicates by use of dedicated link or wireless interface with other satellites to assure that network area coverage adequately serves all nodes, whether fixed or mobile.

Figure 3:
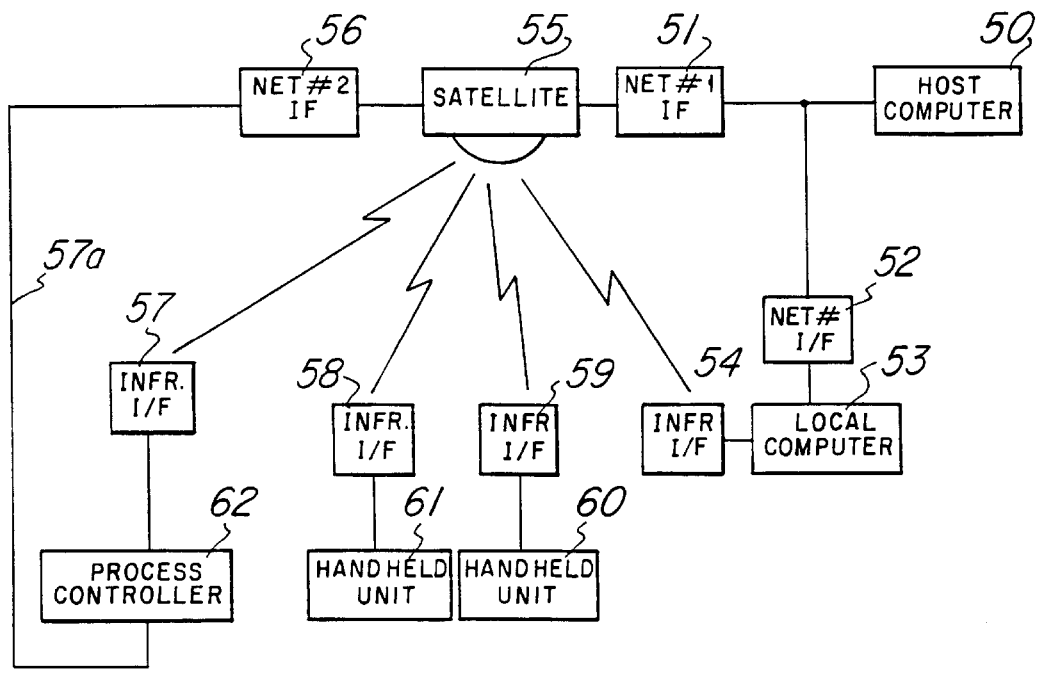
FIG. 3 is a block diagram of a simplified system of the present invention utilizing several hand-held units.

FIG. 3 is a simplified block diagram of one embodiment of the system of the invention. A host computer 50 is interfaced to Network #1 using standard interface techniques. One or more local computers or computer terminals are interfaced with Network #1 through a network interface 52.

An infrared communications satellite 55 is interfaced to Network #1 by an network interface 51. The local computer 53 may also be interfaced to the satellite 55 through an infrared link transceiver 54.

A process controller which may control one of more factory operations is connected Network #2 and then to the host computer through the satellite system. The process controller 62 may be hard wired to the satellite through connection 57a to network interface 56 or may interface with the satellite through infrared link 57. Through either the hard wired connection or infrared link, the controller is connected to the host computer through the satellite 55.

One or more hand-held units 60,61 may send or receive data through satellite 55. Hand-held unit 60, for example, communicates with the satellite through infrared link 59, and hand-held unit 61 communicates with satellite 55 through infrared link 58. Each hand-held unit may be alerted when there is failure, out of specification process parameter, or other non procedural events within a process, or a manufacturing machine operation. Such information may be automatically relayed to a hand-held unit from a process controller, for example process controller 62, via the satellite. The satellite may receive the information, for example, through the hard wired connection 57a to the satellite or through the infrared link 57. Alternatively, the hand-held unit may request the data for use in routine reporting and analysis.

The system has at least the following capabilities: (1) Screen print of hand-held to local printer; (2) Communication with another hand-held unit; (3) Download of files from a local P/C to hand-held; (4) Data Retrieval from programmable controller; (5) Command to programmable controller from hand-held through Network 2; (6) Interface with Host computer through Network 1; (7) Interface with Host computer through P/C inter-face; and (8) Interactive operation between hand-held and Host.

The above capabilities are implemented as follows.

(1) Screen print of hand-held to local printer.

The screen dump of data from a hand-held unit to a local printer occurs when a designated print key on the touch screen is pressed. This activates a device driver resident in the hand-held unit which, after receipt of an acknowledge response from the printer, causes an output of all text and graphics resident in the display buffer to the wireless infrared port, through the communications controller. This is accomplished in 256 byte packages using Manchester encoded HDLC protocol.

Identification of the printer is by use of a unique address transmitted by the hand-held unit and recognized by the printer after which the printer sends an acknowledge response through the wireless infrared link. After receipt of the response, the device driver causes the hand-held unit to send the information currently resident in the display buffer. This information is transmitted serially, using the wireless infrared link through the satellite repeater, to the designated printer unit. Address of the associated hand-held unit is acknowledged in a manner similar to that described.

(2) Communications with another hand-held unit.

Communications between two hand-held units involves a sequence similar to (1) above. The initiating hand-held unit transmits a unique address through the communications port which is sent by wireless link to the repeating satellite. The satellite retransmits the information to the target hand-held unit which, after recognizing the address code, transmits an acknowledge response through the same network to the initiating unit. Each hand-held unit must be in a communications mode, in order for the communications link to be established. With the communications link thus connected, the initiating unit transmits the intended file or block of data, through the network, to the receiving unit. The data is routed through the communications controller and stored in the appropriate memory location, under program control, or under DMA control as appropriate. The applications program then provides access to the memory locations containing the data for viewing on the screen or use in a pending operation, depending on file type.

(3) Download of files from a local P/C to a hand-held unit.

The retrieval, by a hand-held unit, of files or blocks of data from a local computer which is resident on the wireless network uses a technique similar to (2) above. The local computer is placed in a communications mode which makes it a "server" for other units on the network. It is thus in a cooperative mode such that transmission of the appropriate identifying address will cause the unit to acknowledge and respond to the requesting unit. At this point, request for valid data will result in transmission of the data to the requester, using the wireless communications link. All other potential users are locked out until completion of the data transfer or until an appropriate block of data, determined by network limitations, is transferred. This prevents complete dedication of the network server to a single requester while allowing reasonable data transfer rates.

(4) Data Retrieval from a programmable controller.

Interfacing with a programmable logic controller (PLC) is accomplished by using the serial port on the PLC to attach to a wireless infrared interface device, similar to that used for the previously described printer interface. In this data retrieval methodology, task codes, or other suitable commands, are sent to the PLC through the wireless satellite link. This is accomplished by having a series of stored commands in the hand-held unit which are capable of requesting data stored at a particular location to be returned through the serial port of the PLC, when transmitted through the wireless link from the hand-held unit to the PLC. The wireless link then performs in a way which effectively forms a transparent connection between units. This allows the hand-held unit to acquire raw data directly from the controller for data analysis, such as for statistical quality control purposes. Alternatively, since the link can access other functions of the PLC, the hand-held unit can directly send commands, alter programs, or make other communications with the controller which are required.

(5) Command to programmable controller from hand-held through Network #2.

Interface with a programmable logic controller through Network #2 (FIG. 3) is similar to the method described in (4) above, but allows the commands requesting data to be returned, or requesting other required activity from the PLC, to be sent from the hand-held unit to the satellite unit, then through the network gateway interface which is connected to the PLC through the existing factory network. This network gateway can appear as essentially another wireless network node to the hand-held unit with the same data being available from the PLC. Alternatively, the same data can be acquired from a cell controller computer which resides on the network. The hand-held unit can then access the data either through wireless connection to a serial port on the cell controller, or through a method described using the network 2 gateway to the cell controller, through the network connection. This allows higher level information, such as screens of graphs, charts, etc., to be sent to the hand-held unit directly, minimizing local data analysis requirements. The satellite is in a serial link with each of these processes, as a wireless network arbitrator or controller.

(6) Interface with Host computer through Network #1.

Interface with a Host computer through the path designated Network #1 (FIG. 3) is accomplished using wireless communication with the satellite using methods described earlier. The satellite central processing unit accepts the request for communication and, instead of relaying the message to another unit, using the wireless network, routes the message to the network (MAP, ETHERNET, etc.) through a network interface module available currently and installed in a satellite CPU board slot. The address will indicate a unit resident(i.e., Host) on the appropriate wired network to allow the satellite CPU to properly route the message, and also a sending unit for response. Returning information from the Host is addressed to the sending unit and message decoding, protocol changes and transmission is handled by the satellite CPU. In this way, an ongoing dialog between the hand-held (or other) unit, resident on the wireless network, and the Host(or other) unit, may transpire, allowing cooperative transactions, as described in section 8. or routine file transfers between the units.

(7) Interface with Host computer through a P/C interface.

Interface with a Host computer through a local P/C, connected to the wired Network 1 as well as the wireless network, can be accomplished by first establishing a wireless link to the P/C. The address for the message indicates that the P/C is the target, but that the ultimate recipient (second part of address) is the Host(or other) unit resident on Network #1. The P/C, having been placed in a cooperative mode for wireless communication, makes a connection to Network 1, through its network interface module, installed in an appropriate slot in the machine. The message is then transmitted, with the second address and appropriate protocol, to the Host unit. The Host unit then may respond, as described in (6), and return a message to the P/C. This message will again have the appropriate sending unit address. The P/C will then reformat and transmit the response message to the original requesting hand-held(or other) unit, using the wireless network link.

(8) Interactive operation between hand-held and host.

Interactive operation between the hand-held unit and a host computer occurs when the hand-held unit sends a command which initiates a cooperative program in the host computer. This program runs within the host computer but requests inputs from the hand-held unit and accepts inputs sent from this unit as data to be used in its program, using the wireless link. In this way, the hand-held unit operates much like a portable terminal. The process is initiated when the hand-held unit, by selection of a menu item from the screen, indicates to a host computer that a cooperative interface is required in order to perform an operation. The communication link can be routed either through a network interface at the satellite level or through a local computer on the same network having appropriate wireless node capability. Using either path, as selected by the operator, selected menu item initiates an addressed command to the host to load and run a specified program. This program effectively takes control of the requesting terminal and sends screens of data to the terminal showing status of the program and requesting data inputs, through the touch screen, to assist the program.

The screens transmitted to the terminal will have specific queries and responses outlined in menu selectable form. The host program will be placed in a wait mode until a response is received from the terminal, indicating the appropriate operator input. There will be a finite number of possible key positions for each screen so that activation of any key is a proper input for the host program. Receipt of an improper input will be ignored as a means of error checking. Receipt of a legitimate input will cause the host program to resume operation, using the input as program data, until another data input is required. This initiates another screen download to request the required input. This process continues until the program completes or the terminal operator indicates a desire to terminate the program through an abort input. This technique allows the use of powerful host computers to perform detailed diagnostics, evaluations, etc., under control of the portable terminal. Programs which are beyond the capability of the terminal to execute may be run, by the terminal operator, while maintaining the menu driven interface and portability. The operator may thus maintain an intelligent interface with the Industrial System and execute control, collect information, diagnose problems and respond to alarm situations, while retaining a mobile status.

Figure 4:
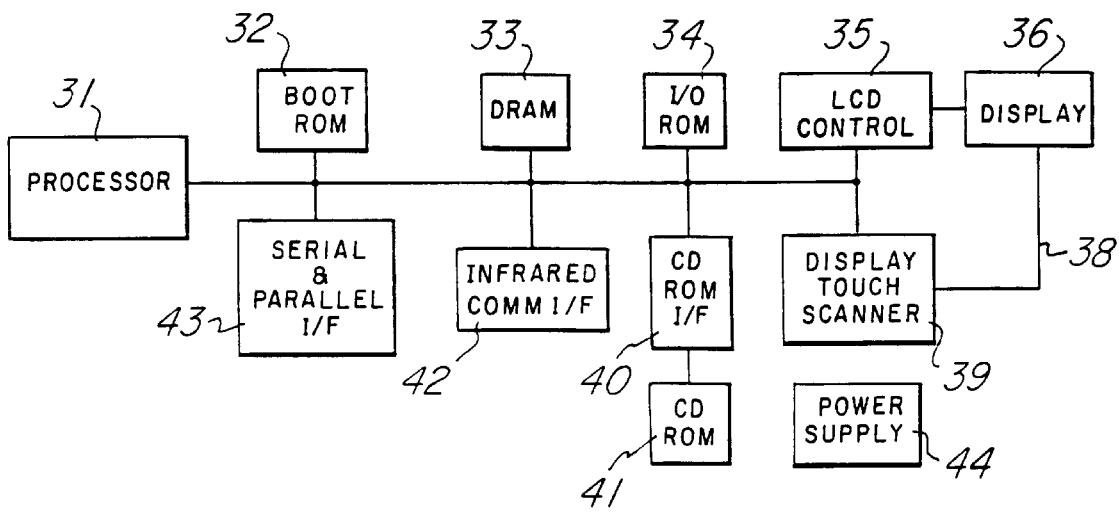
FIG. 4 is a block diagram of the hand-held unit of the invention.

The hand-held unit, illustrated in block form in FIG. 4 contains a CPU/Processor 31 which controls the functions of a portable delivery vehicle.

Connected to the bus of the CPU is a Boot ROM 32 providing the necessary programming to initialize the hand-held unit. A DRAM 33 provides additional memory for program storage and execution and other uses within the unit. For example, ROM or EPROM programs within the hand-held unit may be transferred into the memory for execution. ROM memory may be structured as a ROM disk memory, with the characteristics of a standard disk memory. Serial and parallel interfaces 43 are provided to provide printer interfaces or a communication interface.

The wireless IR interface circuit 42 provides the unit with send/receive infrared diode interface for infrared communications with a system satellite.

A CD ROM interface 40 interfaces the unit with a CD ROM 41 to provide a large capacity data storage within the unit. The CD ROM may be incorporated within the hand-held unit or may be a detachable unit which may be separated from the hand-held unit when such data capacity is not continuously needed.

Additional interfaces may be incorporated into the hand-held unit. for example, a host development interface may be used to connect the hand-held unit to a host computer for program development. The interface would permit the hand-held unit to utilize programs stored on disk drives in the host computer, for example a personal computer, to test the program for use in the hand-held unit.

Additional interfaces such as an interface for a bar code reader may be provided for the hand-held unit to permit it to be used as an inventory control unit, or a digital interface may be provided to interface the unit with digital test equipment.

The display unit includes LCD Control 35, Display Touch Scanner 39 and display 36. The display is used for displaying information and as an input to the device through the touch sensitive screen.

The screen, through the LCD controller and the internal programming, may be used to show graphic key pads to provide touch inputs and menu selection. Also, text or graphic figures may be touched to display information relating to the word or graphic figure. For example, in a diagram illustrating a process, a part of the diagram may be touched to display the operating parameters of part of the process touched, or text may be displayed to explain the operation of the process at that point. This has been referred to as hypertext in the literature.

Upon activation, the unit performs a boot and diagnostic operation after which a directory read of the selected memory device is performed to determine possible operations with the existing memory. This directory is interpreted and displayed on the LCD screen 36 as potential delivery functions for selection by the operator.

CPU 31 provides the housekeeping functions of the menu driven, touchscreen input as well as the computational functions required for delivery of specific information such as expert system driven diagnostics, fault-tree diagnostics, manual reading, graphics output, information download or upload from other network available devices, etc.

Upon selection, the function is performed by activating the proper program. This results in subsequent menu driven screens which lead the operator either through subsequent setup operations or indicate the method of use of the application program through menu driven selections or responses. Various memory devices may be employed, including CD-ROM 41, to make large amounts of memory available to the operator.

The hand-held unit employs a power supply scheme which allows the unit to maintain or recharge the batteries without use of a direct coupling from the charger to the unit. This inductive coupling technique provides the required charging capability without the hazard of connectors and wires.

The hand-held unit includes a rechargeable power supply 44 to provide power to the unit and allow the unit to be totally portable.

Figure 5:
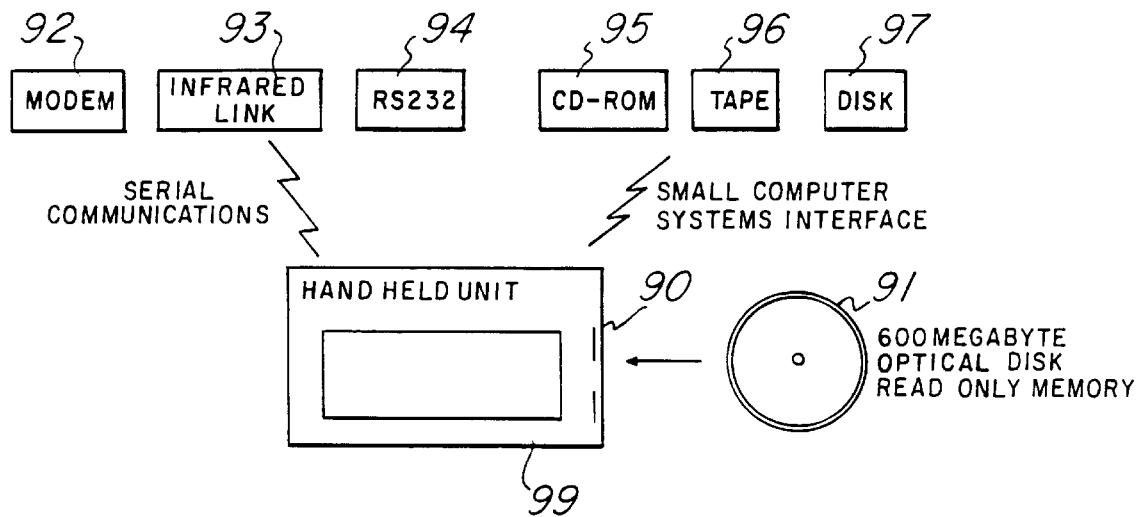
FIG. 5 illustrates a block representation of one design of a hand-held unit

FIG. 5 is a block illustration of one possible overall design of the hand-held unit. The hand-held unit 90 having a touch screen 99 may have a modem 92 therein for telephonic communication. An infrared interface 93 (transmitter and receiver) may be used to interface with an infrared link. A serial communication interface 94 may be used to directly connect the unit with other systems. A CD-ROM 95 may be used in conjunction with a compact disk to store up to 600 Megabytes of data within the unit.

The compact disk drive may be incorporated into the hand-held unit or, to keep the unit small, may be an attachable unit. A tape interface unit 96 may be used to connect a tape system, and an interface 97 may be used to connect a disk system.

Figure 6:
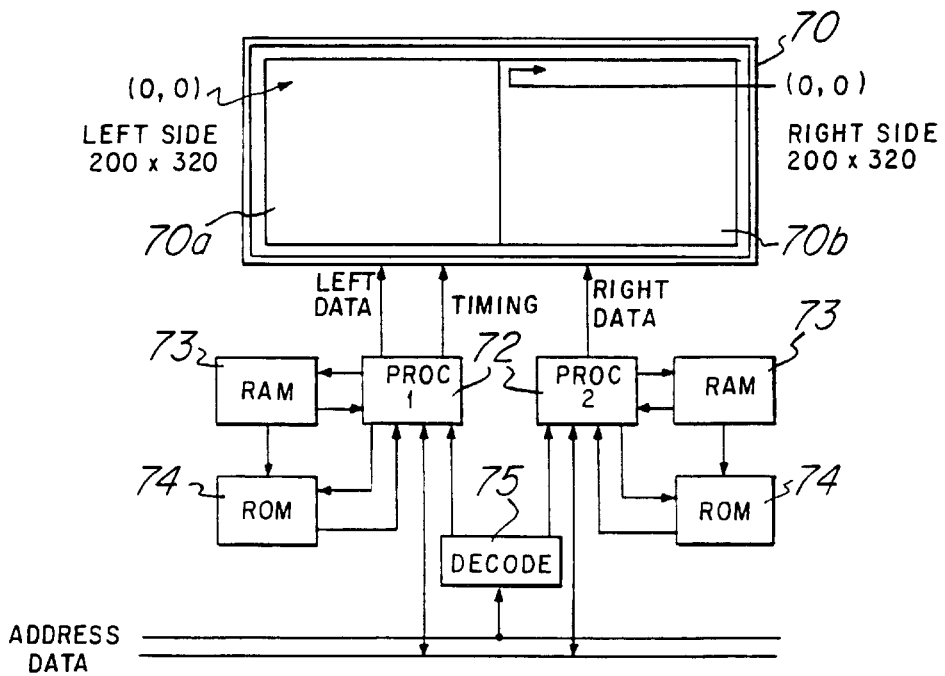
FIG. 6 illustrates the control circuitry in block form of the split screen display.
Figure 7:
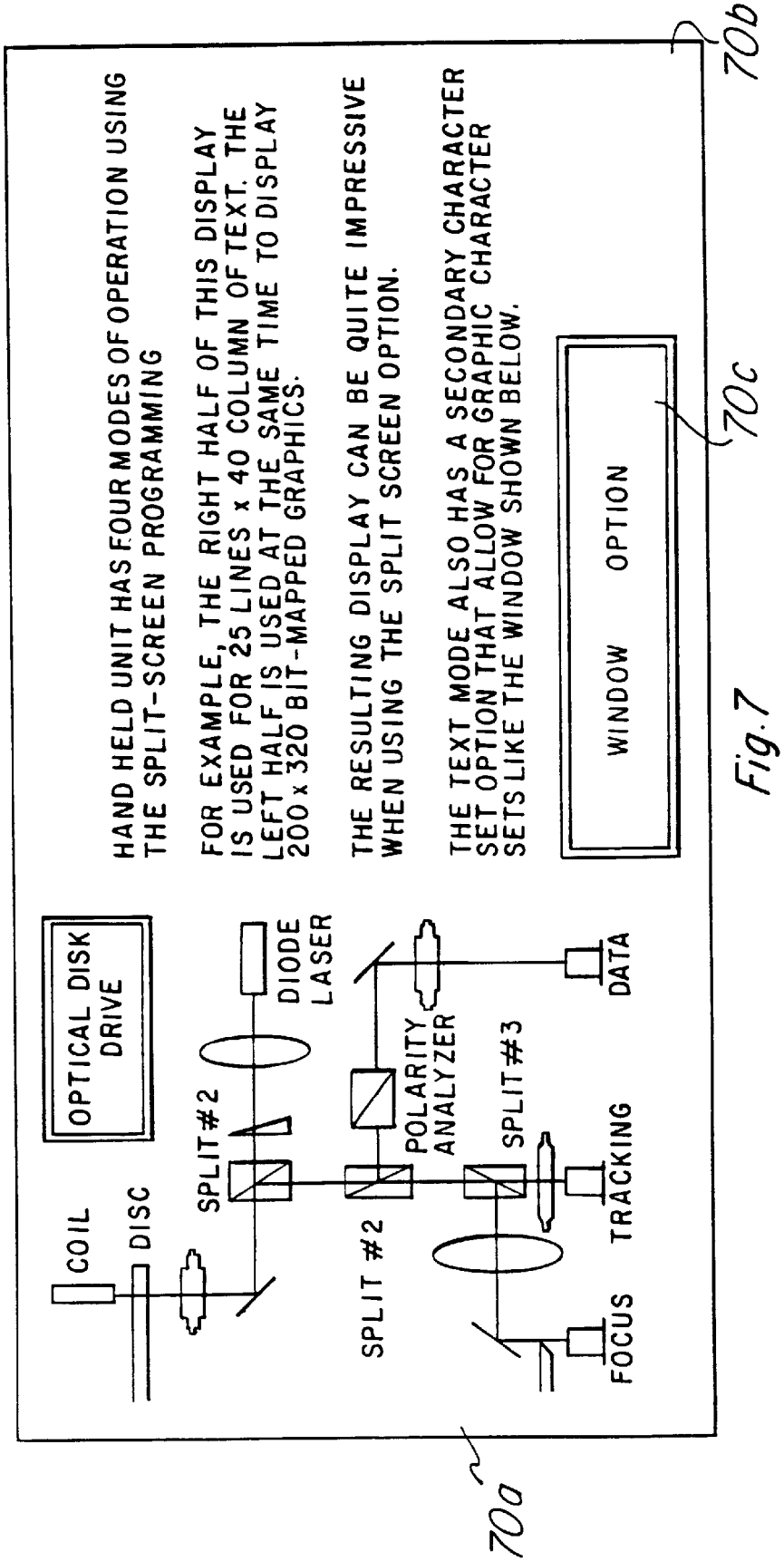
FIG. 7 illustrates an example of a split screen display.
Figure 8:
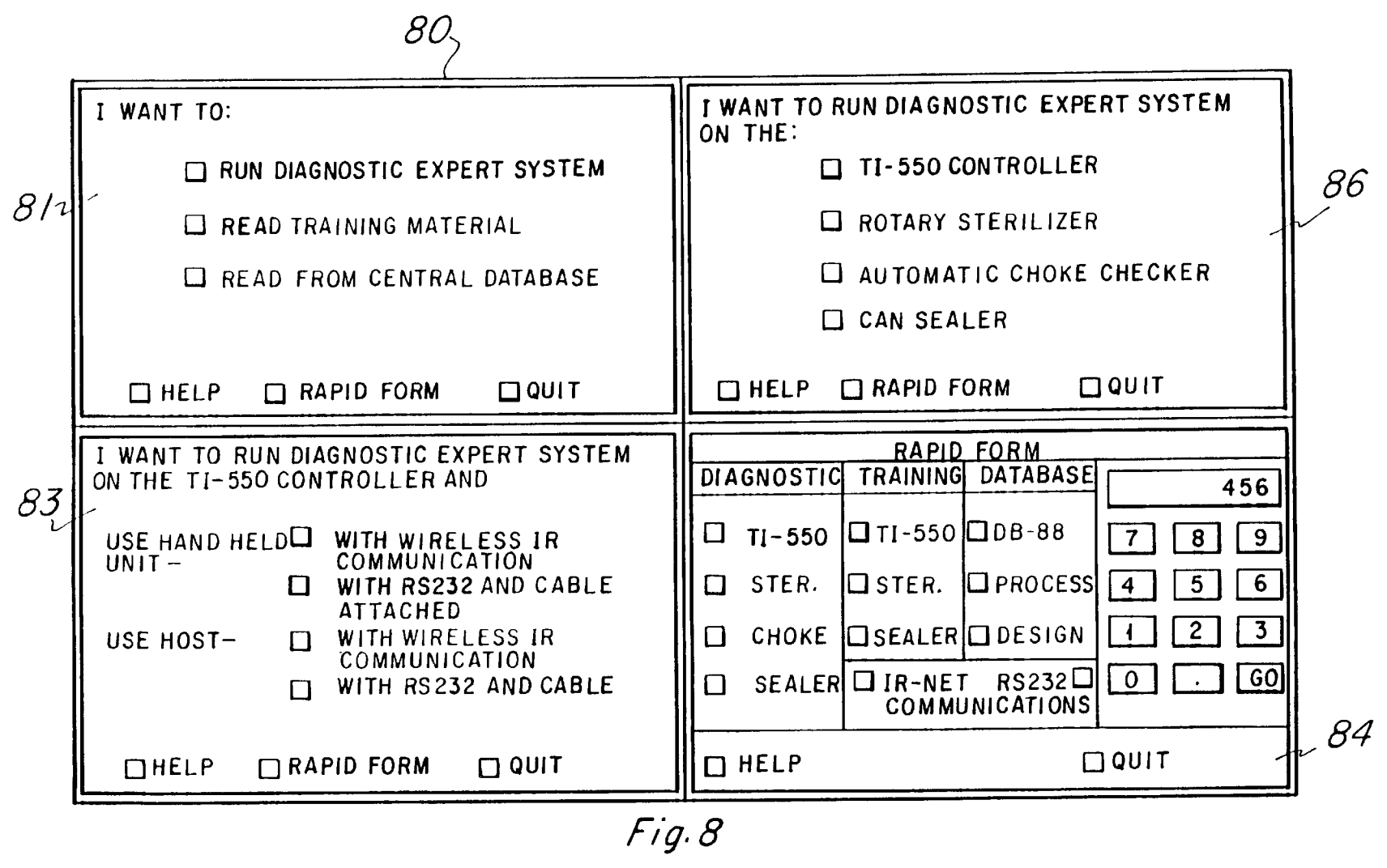

FIGS. 6, 7 and 8 illustrate the various aspects of the liquid crystal display (LCD) used in the hand-held unit of the invention. An LCD display is illustrated herein, but other types of screens as well as touch sensitive schemes may be used. FIG. 6 is a block diagram illustrating the control of each half of the LCD to present either graphic display or text. The LCD 70 is divided into two equal parts 70a and 70b. Each side is driven by a processor 72 and includes a RAM 73 and ROM 74. A decode circuit 75 directs data received on the address and data buses to the desired side of the LCD screen. In the graphics mode, the display has complete bit mapping and is capable of N×N charater fonts. Reverse video may be use to emphasize a display, and extended ANSI-like commands may be used for drawing lines, points, and dumping graphic files.

FIG. 7 illustrates a split screen display. The left side of the screen 70a is graphically displaying in schematic form an optical disk drive, using 200×320 bit-mapped graphics. The right side of the screen is in the text mode and is capable of displaying 25 lines by 40 columns of text.

A window option 70c is also available on the right side 70b of the LCD screen to allow the use of graphic character sets in text mode. The left and right sides are identical and may be in either the text or graphics mode.

FIG. 8 illustrates an example sequence of screen menu displays to demonstrate an example of use of the present invention.

The first screen menu 81 provides for six choices read from the memory directory. The first choice "RUN DIAGNOSTIC EXPERT SYSTEM" permits the operator to run a diagnostic on a specific system or factory process. This first choice directs the operator to another screen menu, menu 86. In screen 86, diagnostics can be run on four different systems: TI-550 CONTROLLER; ROTARY STERILIZER; AUTOMATIC CHOKE CHECKER; and CAN SEALER. These four are representative of systems or machinery that may be found in a factory environment. The operator may select the desired system by touching the block in front of the system name.

Returning to screen menu 81, a second choice may be "READ TRAINING MATERIAL". From this menu selection the operator may obtain training information on the various type of machines and processes in the factory. The information may be obtained from, for example, a CD-ROM in the hand-held unit, or from a host or central computer.

The third option on screen menu 81 is "READ FROM CENTRAL DATABASE". This option connects the hand-held unit to the host computer to use the various data bases stored therein.

The other three selections on screen menu 81 are "HELP", "RAPID FORM" and "QUIT". HELP brings help instructions to the LCD screen to assist the operator. RAPID FORM directs the operator to screen menu 84, and QUIT indicates to the hand-held unit that there is to be no other input to the unit at this time, and place the hand-held unit in a stand-by condition.

Screen menu 83 permits a diagnostic to be run using the hand-held unit data, or host computer data. Also, the choice of communications may be selected, for example, the Infrared link may be used, or direct wire communications may be used through the serial RS232 port of the hand-held unit.

Screen menu 84 is labeled "RAPID FORM", and is a composite of screens 81, 83 and 86. An experienced operator may simply touch the desired menu touch squares in front of the desired operation or function and avoid the necessity of having to step through the other preceding screens to accomplish a desired task. Three menu categories are presented: DIAGNOSTIC; TRAINING; and DATABASE.

The DIAGNOSTIC category presents the same choices as screen menu 82.

Under TRAINING, information may be obtained, for example, on the TI-550 CONTROLLER, the ROTARY STERILIZER, and the CAN SEALER. The information available may range from operation of each to diagrams and diagnostic data.

The DATABASE category may, for example, include design and process data, statistics on operation parameters, or any other data needed in system, machine or factory operation.

In addition to running diagnostic test on systems and machinery on the factory floor, the system, including the hand-held unit, may be use in connection with an alarm system to alert machine operator and maintenance personnel of out-of-process parameters in systems, and malfunctions in machinery.

Each factory system may be provided with appropriate fail or out-of-specification alarm detectors or programmable logic controllers which continuously monitor the operation of machines and systems on the factory floor. When there is a machine failure, or out-of-specification process parameter, such "error" is communicated to a central computer, or to a satellite repeater, and such "error" is communicated to a hand-held unit carried by process control technicians or maintenance personnel. Upon receipt of an "error" alarm, personnel carrying a hand-held unit may interrogate the unit as to the location of the "error". Upon such interrogation, a map of the factory floor may be displayed indicating the general location on the factory floor of the cause of the "error" signal. Upon further interrogation, the hand-held unit will identify the specific machinery and/or process initiating the "error" signal.

Upon arrival, data either stored in memory in the hand-held unit, or data transmitted to the hand-held unit from a central computer, indicating the possible cause of the error may be displayed, or in the cause of a malfunctioning circuit, a schematic of the circuit may be displayed showing the malfunctioning circuit component. In utilizing such a system, a minimum of factory personnel will be able to locate any malfunction and correct it rapidly.

A further example of an embodiment and use of the invention is the use of the hand-held use by executive personnel of a company. Key executives may use the hand-held unit to obtain planning and financial information in meetings or while on trips.

While in meetings, each executive may have stored in an optical disk, data to be presented in the meeting, or may through infrared links obtain information from a mainframe computer. The hand-held unit being portable, and capable of communicating through infrared links, permits use and data retrieval without direct connection to another computer. Plug in ROM programming may be used to change the programs in the hand-held unit to provide for various uses, and to present different touch screen menus for the unit's various uses.

Provision may be made to change the touch screen into a keyboard, or a small key board may be attached to provide communications capability for an executive while on trips. An internal modem may be used to connect the hand-held unit to a telephone and allow the executive to retrieve information from the home-base computer in addition to information stored in an optical disk, or via the IR wireless network.

What is claimed:

1. A self-contained portable handheld computing unit, comprising:
   a processor unit to process data for the self-contained portable handheld computing unit;
   a boot ROM having data to boot the self-contained portable handheld computing unit;
   an input/output ROM to input and output data for the self-contained portable handheld computing unit;
   at least one input/output port to input and output data;
   a communication interface to interface with the self-contained portable handheld computing unit;
   a RAM memory;
   a display to display data for said self-contained portable handheld computing unit;
   a display touch scanner to input data for said self-contained portable handheld computing unit; and
   an optical disk interface to interface with stored data for the self-contained portable handheld computing unit,
   wherein the communication interface is an infrared communication interface.

2. The self-contained portable handheld computing unit as in claim 1, including a compact disk system.

3. The self-contained portable handheld computing unit as in claim 1, including additional ROM memory structured as a ROM disk memory, with the characteristics of a standard disk memory.

4. The self-contained portable handheld computing unit as in claim 1, including additional interfaces to interface with bar code readers and digital read-out equipment.

5. The self-contained portable handheld computing unit as in claim 1, including a host development interface, to interface the self-contained portable handheld computing unit with other self-contained portable handheld computing units having disk drives therein, and communicating with the disk drives in the other self-contained portable handheld computing units from the self-contained portable handheld computing unit.

6. The self-contained portable handheld computing unit as in claim 2, wherein the optical disk interface is removable from the computing unit.

7. The self-contained portable handheld computing unit as in claim 2, wherein the optical disk is a 600 Megabyte compact disk read only memory.

8. The self-contained portable handheld computing unit as in claim 1, wherein the display is a liquid crystal display and is programmable to have touch sensitive areas on the screen for input to the self-contained portable handheld computing unit.

9. The self-contained portable handheld computing unit as in claim 1, wherein the infrared communications interface, includes infrared transmit and received circuits to provide infrared communications to and from the self-contained portable handheld computing unit.

10. The self-contained portable handheld computing unit as in claim 1, wherein the communication interface is addressable and is capable of automatically receiving communications addressed to the self-contained portable handheld computing unit via the communication interface.

11. The self-contained portable handheld computing unit as in claim 1, including at least one serial input/output port, an optical disk port, and at least one parallel interface port.

12. The self-contained portable handheld computing unit as in claim 1, including a rechargeable battery power supply and a circuit for induction recharging of the batteries in the self-contained portable handheld computing unit.

13. The self-contained portable handheld computing unit as in claim 8, wherein the display is operable in a split screen mode to provide both graphics and text displays simultaneously.

14. The self-contained portable handheld computing unit as in claim 8, wherein the touch input is programmable to provide a matrix keypad and graphics icon input.

15. The self-contained portable handheld computing unit as in claim 8, including first and second processor units for independently programming each half of the display screen for text and graphic display.

16. The self-contained portable handheld computing unit as in claim 1, wherein the screen is programmable to display multiple menus, including touch sensitive areas on each menu to provide for item selection from the menu.

17. The self-contained portable handheld computing unit as in claim 16, wherein highlighted words or highlighted displayed graphic figures may be touched to display additional information.

18. A self-contained portable handheld unit, comprising:
a processor unit to process data for the self-contained portable handheld computing unit;
a boot ROM including programming for initialization of the self-contained portable handheld computing unit;
an input/output ROM to input and output data for a self-contained portable handheld unit;
at least one input/output port coupled to input/output ROM;
a communication interface for automatic addressing and communication with the self-contained portable handheld unit from a remote source;
a RAM memory to store data for said self-contained portable handheld computing unit;
a display to display data from said self-contained portable handheld unit;
a display touch scanner to input data to said self-contained portable handheld unit; and
an optical disk interface to store data for said self-contained portable handheld unit,
wherein the communication interface is an infrared communication interface.

19. The self-contained portable handheld unit as in claim 18, including an optical disk interface and an optical disk system.

20. The self-contained portable handheld unit as in claim 19, wherein the optical disk interface is removable from self-contained portable handheld unit.

21. Self-contained portable handheld unit as in claim 19, wherein the optical disk is a 600 Megabyte compact disk read only memory.

22. The self-contained portable handheld unit as in claim 18, wherein the display is a liquid crystal display and is programmable to have touch sensitive areas on the screen for input to the self-contained portable handheld unit.

23. The self-contained portable handheld unit as in claim 18, wherein the infrared communications interface, includes infrared transmit and receive circuits to provide infrared communications to and from the self-contained portable handheld unit.

24. The self-contained portable handheld unit as in claim 18, wherein the communication interface is addressable and is capable of automatically receiving communications addressed to the computing unit via the circuit communication interface.

25. The self-contained portable handheld unit as in claim 18, including at least one serial input/output port, an optical disk port, and at least one parallel interface port.

26. The self-contained portable handheld unit as in claim 18, including a rechargeable battery power supply and a circuit for induction recharging of the batteries in the self-contained portable handheld unit.

27. The self-contained portable handheld unit as in claim 22, wherein the display is operable in split screen mode to provide both graphics and text displays.

28. The self-contained portable handheld unit as in claim 22, wherein the screen is programmable to provide a matrix keypad.

29. The self-contained portable handheld unit as in claim 22, wherein the screen is programmable to provide graphic icon input.

30. The self-contained portable handheld unit as in claim 22, including first and second processor units for independently programming each half of the display screen for text and graphic display.

31. The self-contained portable handheld unit as in claim 18, wherein the screen is programmable to display multiple menus, including touch sensitive areas on each menu to provide for item selection from the menu.

32. A self-contained portable handheld unit, comprising, a processor unit to process data for self-contained portable handheld computing unit, a boot ROM including programming for initialization of the self-contained portable handheld computing unit, an input/output ROM in input and output data for the self-contained portable handheld computing unit, at least one input/output port coupled to the self-contained portable handheld computing unit, a RAM memory, an infrared communication interface for automatic addressing and communication with the self-contained portable handheld computing unit from a remote source, a display for the self-contained portable handheld computing unit, said display being programmable to display multiple menus, including touch sensitive areas on each of said multiple menus to provide for item selection from the menus, a split screen circuit to provide both simultaneous text and graphic screen on said display, and a display touch scanner to scan said touch sensitive areas.

* * * * *